(12) United States Patent
Sexton et al.

(10) Patent No.: US 10,556,685 B2
(45) Date of Patent: Feb. 11, 2020

(54) HEADER ASSEMBLY AND METHOD THEREFORE

(71) Applicant: The Boeing Company, Chicago, IL (US)

(72) Inventors: Frank Sexton, Mukilteo, WA (US); Jonathan R. Wightman, Everett, WA (US); Patrick Malkinson, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 15/608,192

(22) Filed: May 30, 2017

(65) Prior Publication Data

US 2018/0346123 A1 Dec. 6, 2018

(51) Int. Cl.
*B64D 11/00* (2006.01)

(52) U.S. Cl.
CPC .................. *B64D 11/0023* (2013.01)

(58) Field of Classification Search
CPC ......... B64D 11/0023; G09F 7/02; G09F 7/06; G09F 2007/1891; G09F 2013/044; G09F 13/04

See application file for complete search history.

(56) References Cited

U.S. PATENT DOCUMENTS

| | | | | | |
|---|---|---|---|---|---|
| 4,017,989 | A | * | 4/1977 | Murray | A47G 1/065 40/731 |
| 4,779,369 | A | * | 10/1988 | Hill | F16B 5/0664 248/223.41 |
| 5,172,504 | A | * | 12/1992 | De Maat | G09F 7/18 40/605 |
| 5,230,175 | A | * | 7/1993 | Follis | G09F 15/0006 40/605 |
| 5,428,914 | A | * | 7/1995 | Whitehouse | G09F 7/06 40/594 |
| 5,577,831 | A | * | 11/1996 | Chang | F21V 33/0056 362/124 |
| 6,082,032 | A | * | 7/2000 | Gabrius | G09F 13/0413 40/572 |
| 6,575,314 | B2 | * | 6/2003 | Lung | A47F 5/05 211/163 |
| 8,333,026 | B2 | * | 12/2012 | Southard | A47G 1/065 40/605 |
| 2002/0144441 | A1 | * | 10/2002 | Zentmire | G09F 3/20 40/575 |
| 2009/0056183 | A1 | * | 3/2009 | Reiland | G02B 6/005 40/564 |
| 2009/0313919 | A1 | * | 12/2009 | Chuang | A47F 5/0846 52/202 |
| 2011/0094135 | A1 | * | 4/2011 | Frey | G09F 7/00 40/605 |

(Continued)

*Primary Examiner* — Gary C Hoge

(74) *Attorney, Agent, or Firm* — Perman & Green, LLP

(57) ABSTRACT

A header assembly including a structural core member, at least one branding panel removably coupled to the structural core member, and at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member.

20 Claims, 10 Drawing Sheets

(56) References Cited

U.S. PATENT DOCUMENTS

| | | | |
|---|---|---|---|
| 2012/0117910 A1* | 5/2012 | Chuang | A47B 96/20 52/588.1 |
| 2016/0167786 A1 | 6/2016 | Maclay et al. | |
| 2016/0264243 A1* | 9/2016 | Madhav | G03B 31/00 |
| 2018/0148172 A1* | 5/2018 | Verbeque | B64D 11/0023 |
| 2018/0194471 A1* | 7/2018 | Merrick | B64D 11/0023 |
| 2018/0346124 A1* | 12/2018 | Radacovici | B64D 11/003 |

* cited by examiner

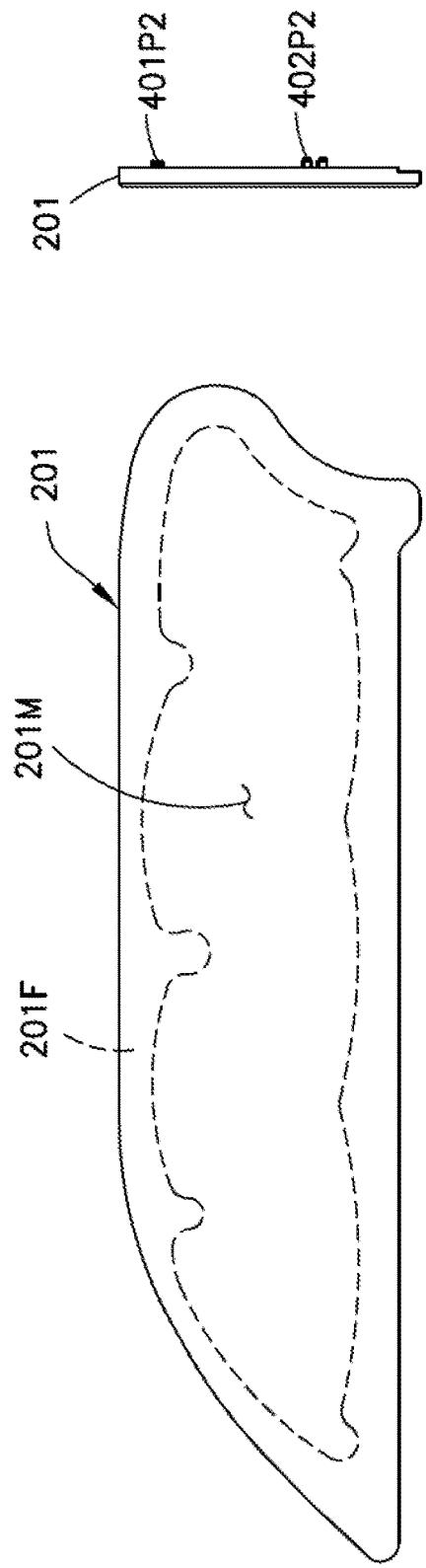
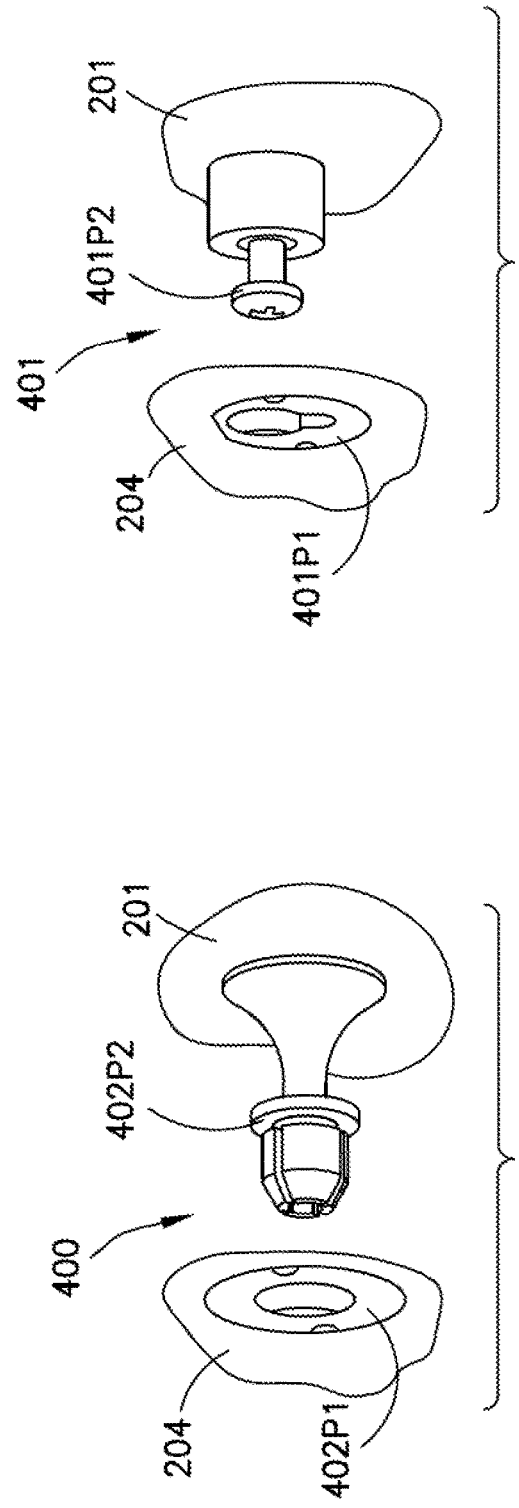
FIG.4A
FIG.4B
FIG.4C
FIG.4D

HEADER ASSEMBLY AND METHOD THEREFORE

BACKGROUND

1. Field

The aspects of the present disclosure generally relate to header assemblies and, in particular, to headers that at least limit the passage of light between different sections of an interior cabin of a vehicle.

2. Brief Description of Related Developments

Generally, aircraft include an interior cabin that may be divided into numerous sections. For example, a cockpit of the aircraft is separated from a passenger cabin. The passenger cabin may also be subdivided into a first class section, a business class section, and a coach section. The passenger cabin may also include one or more work area sections for flight personnel, such as galleys, which may include food and beverage storage structures. One or more aisles pass through the passenger cabin and connect each of the above-mentioned sections of the interior cabin, where the one or more aisles form a path between the above-mentioned sections and one or more doors of the aircraft.

Each of the above-mentioned sections may be separated from an adjacent section (such as, for exemplary purposes only, the first class section and the business class section) by a cabin transition area. The cabin transition area may include one or more monuments, such as walls, work stations, or the like. Curtains may be used to separate the sections of the aircraft for a variety of reasons, including class separation, privacy, work areas, etc. For example, a cabin transition area between the business class section and the coach section, may include a curtain assembly within an aisle. A curtain is movably coupled to a curtain track that spans over the aisle and may be selectively opened and closed. When opened, such as during a boarding process, passengers may pass from one section to another section. During flight, the curtain may be closed to indicate that passengers are not allowed to pass (or at least discourage passengers from passing) from one section to another section.

Generally headers are placed above the curtain assemblies to further separate the sections, such as to block light. One conventional header is formed of fabric. However, fabric headers are generally flimsy, porous, and do not interface well with mating structure, thereby allowing a substantial amount of light to pass therethrough. Further, many fabric headers are unsightly, and susceptible to being deformed during flight.

Another conventional header is a linear panel header formed of a solid material. This linear panel header typically straddles onto an upper curtain track of the curtain. The linear panel header is coupled to the upper curtain track so as to not be easily removable. These linear panel headers also generally require a separate foam block that is placed between the linear panel and the surrounding structure, such as in the outboard ceiling wash light cove, to prevent light from passing around the header and between sections.

SUMMARY

The following is a non-exhaustive list of examples, which may or may not be claimed, of the subject matter according to the present disclosure.

One example of the subject matter according to the present disclosure relates to a header assembly comprising: a structural core member; at least one branding panel removably coupled to the structural core member; and at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member.

Another example of the subject matter according to the present disclosure relates to a header assembly comprising: a structural core member configured for coupling with a curtain header rail of an aircraft, the structural core member having an first side and a second side, the second side being spaced from the first side so as to form opposite sides of the structural core member; a first branding panel removably coupled to the first side of the structural core member; a second branding panel removably coupled to the second side of the structural core member; and at least one quick-connect coupling disposed on each of the first side and the second side of the structural core member, each quick-connect coupling having a first quick-connect portion coupled to a respective one of the first side and the second side of the structural core member, and a second quick-connect portion coupled to a respective one of the first branding panel and the second branding panel, the second quick-connect portion being configured to mate with a respective first quick-connect portion to removably couple a respective one of the first branding panel and the second branding panel to the respective one of the first side and the second side of the structural core member.

Still another example of the subject matter according to the present disclosure relates to a method using a header assembly, the method comprising: selecting at least one branding panel from a number of branding panels; and removably coupling the at least one branding panel to a structural core member with at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member; wherein the structural core member is coupled to a vehicle frame.

BRIEF DESCRIPTION OF THE DRAWINGS

Figure 1:
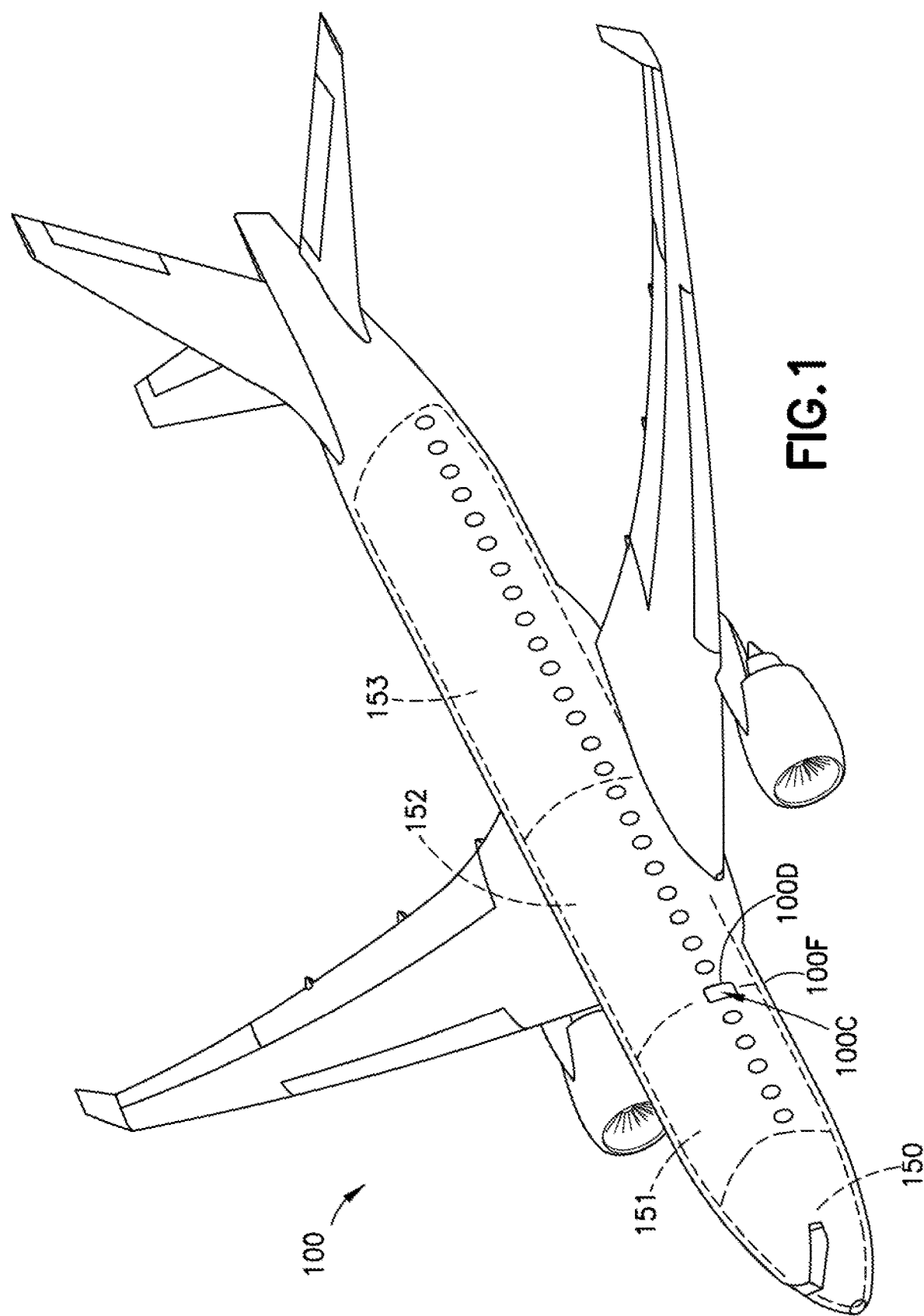
Figure 2:
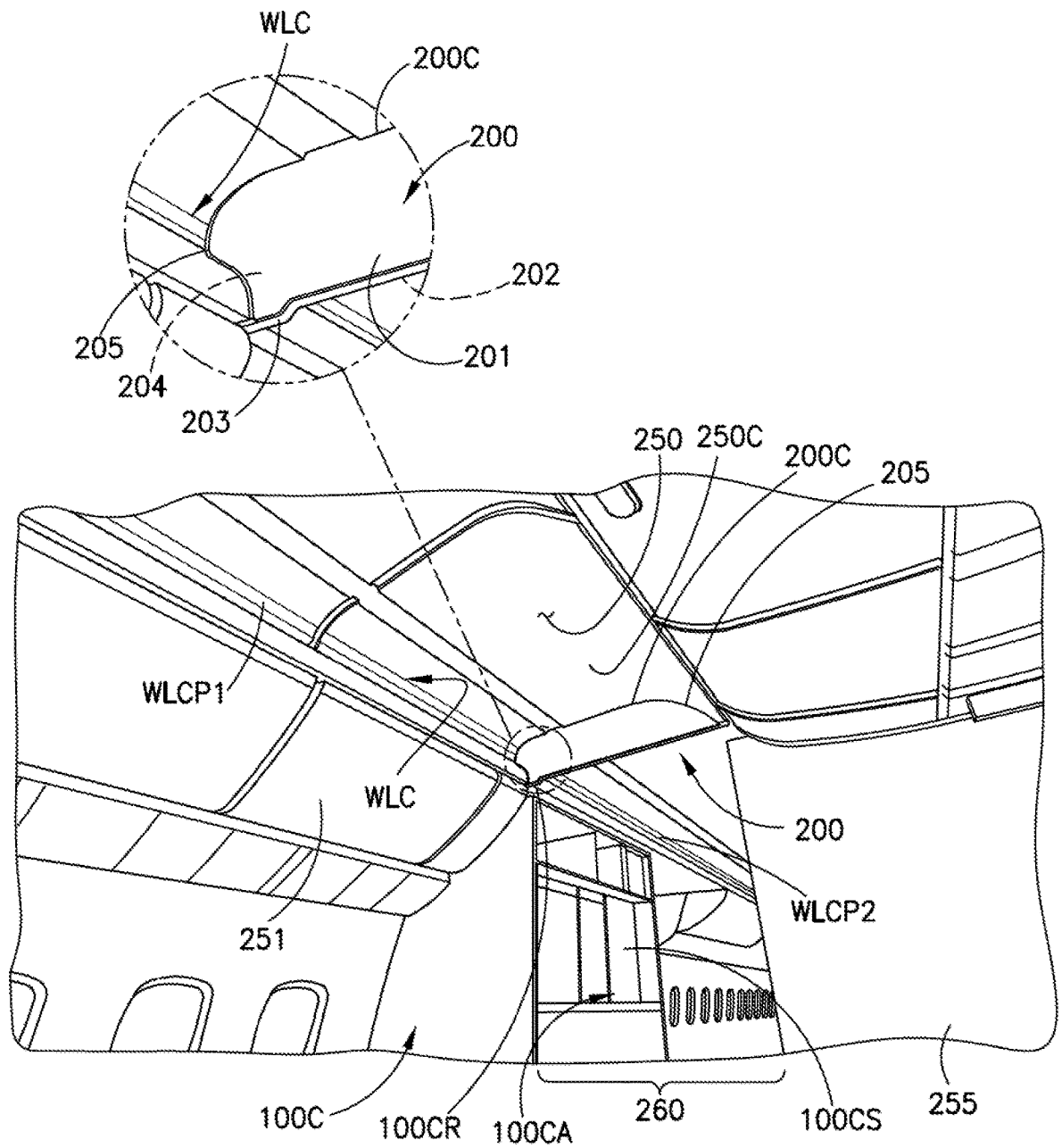
Figure 3A:
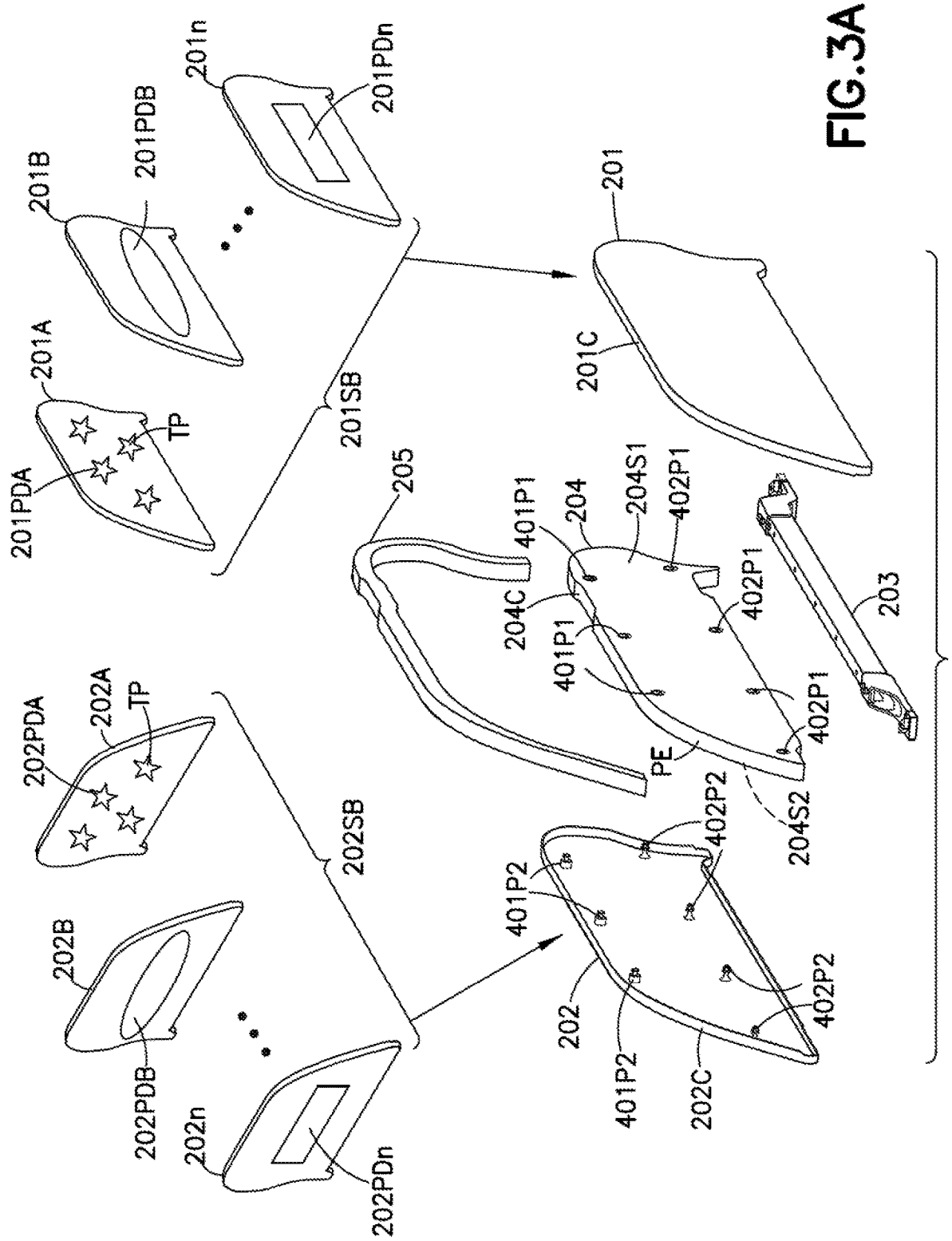
Figure 3B:
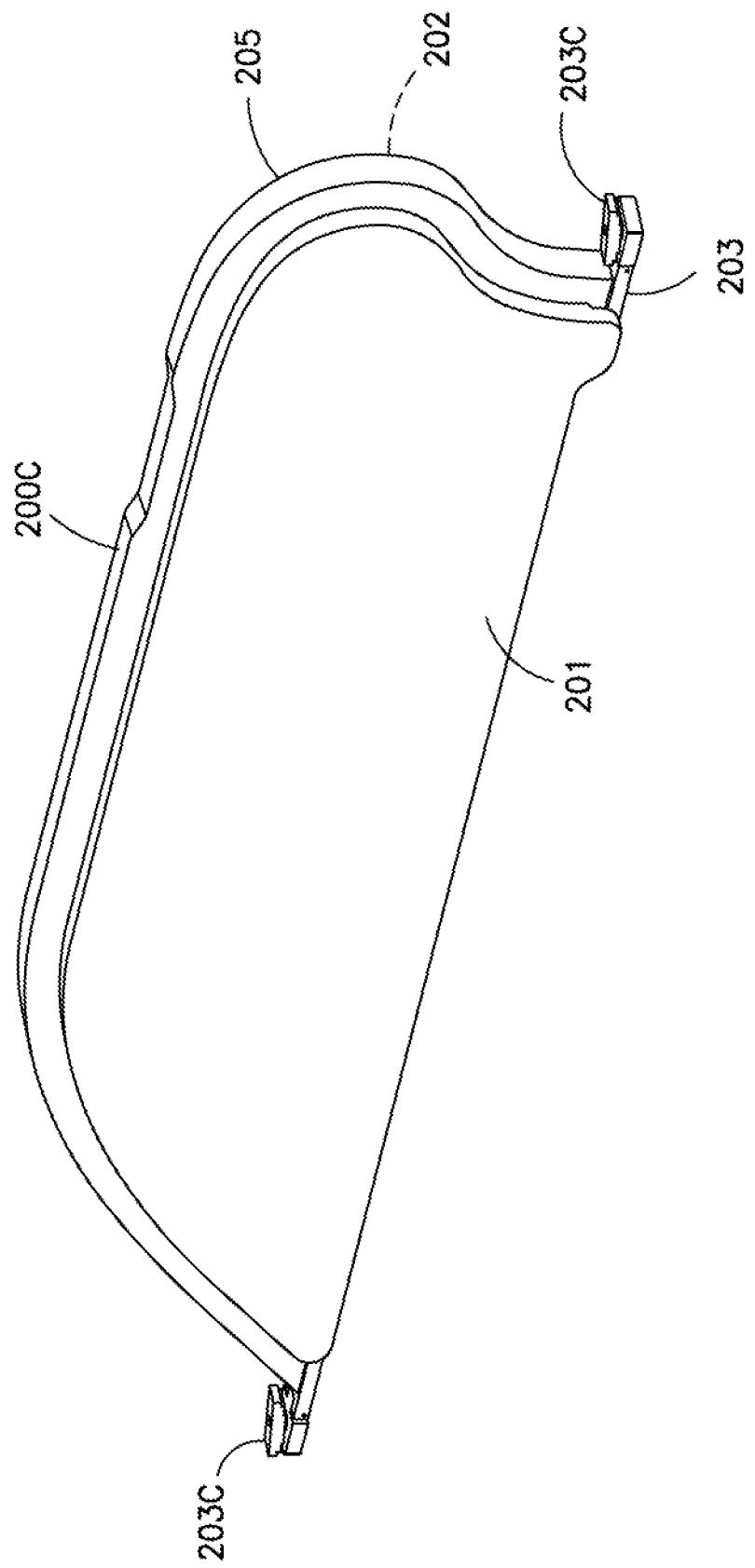
Figure 3C:
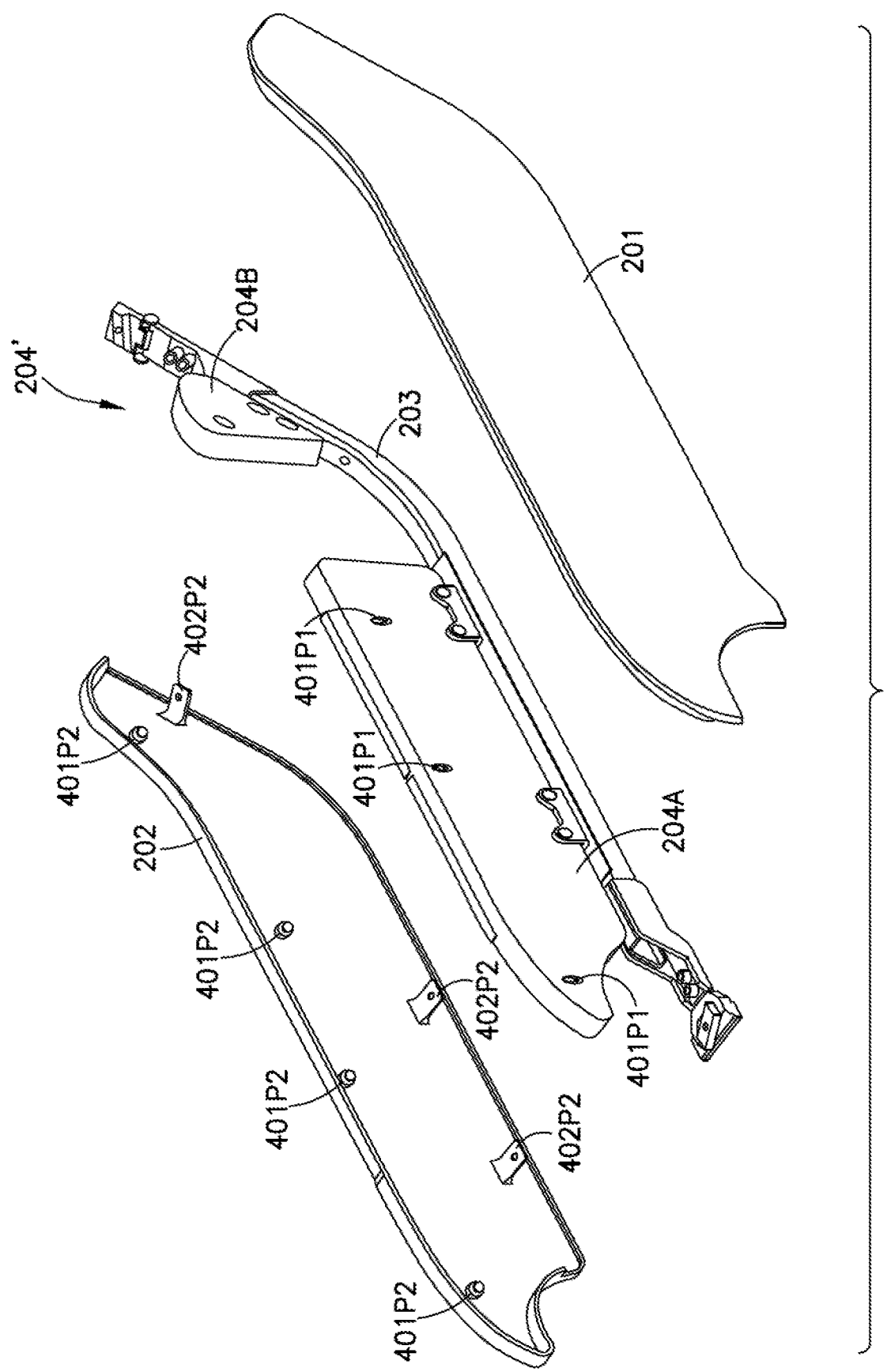
Figure 5:
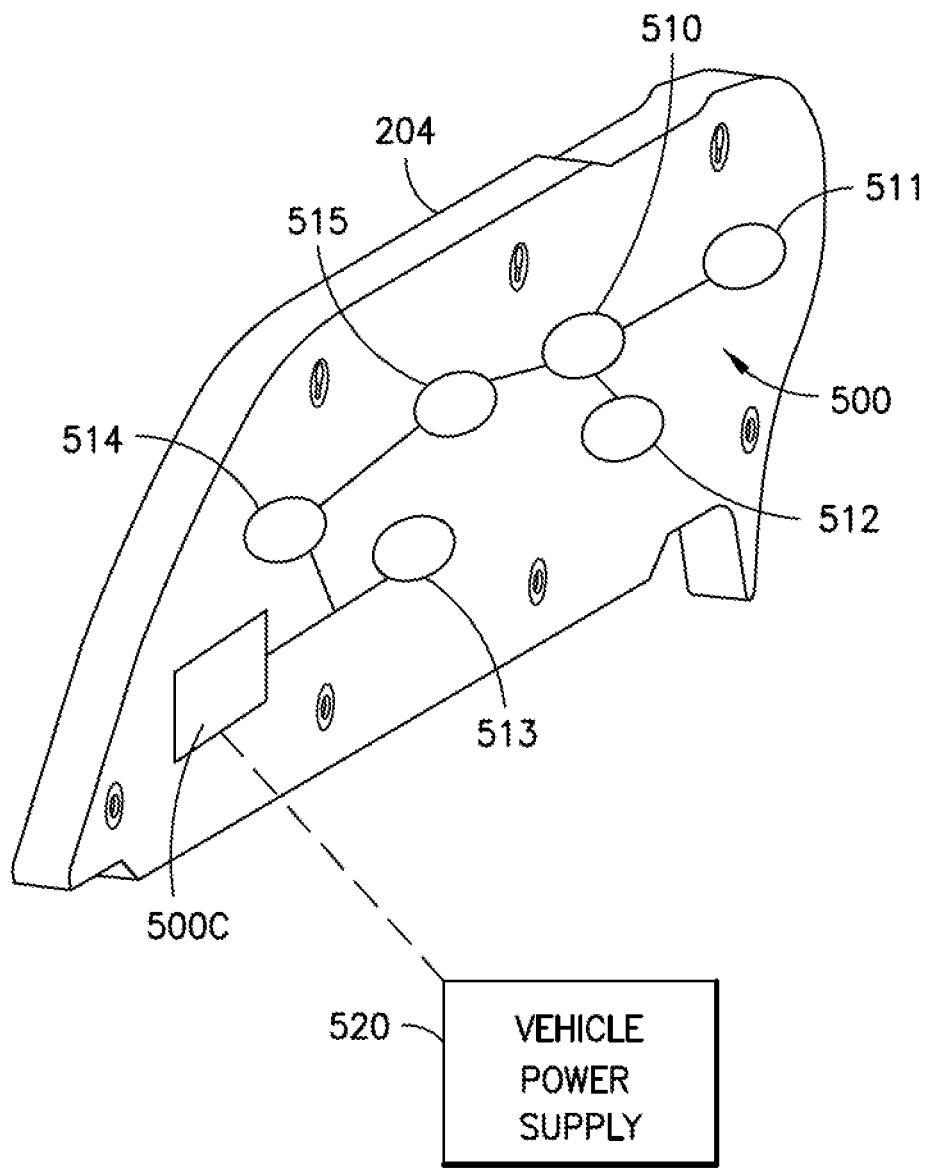
Figure 6:
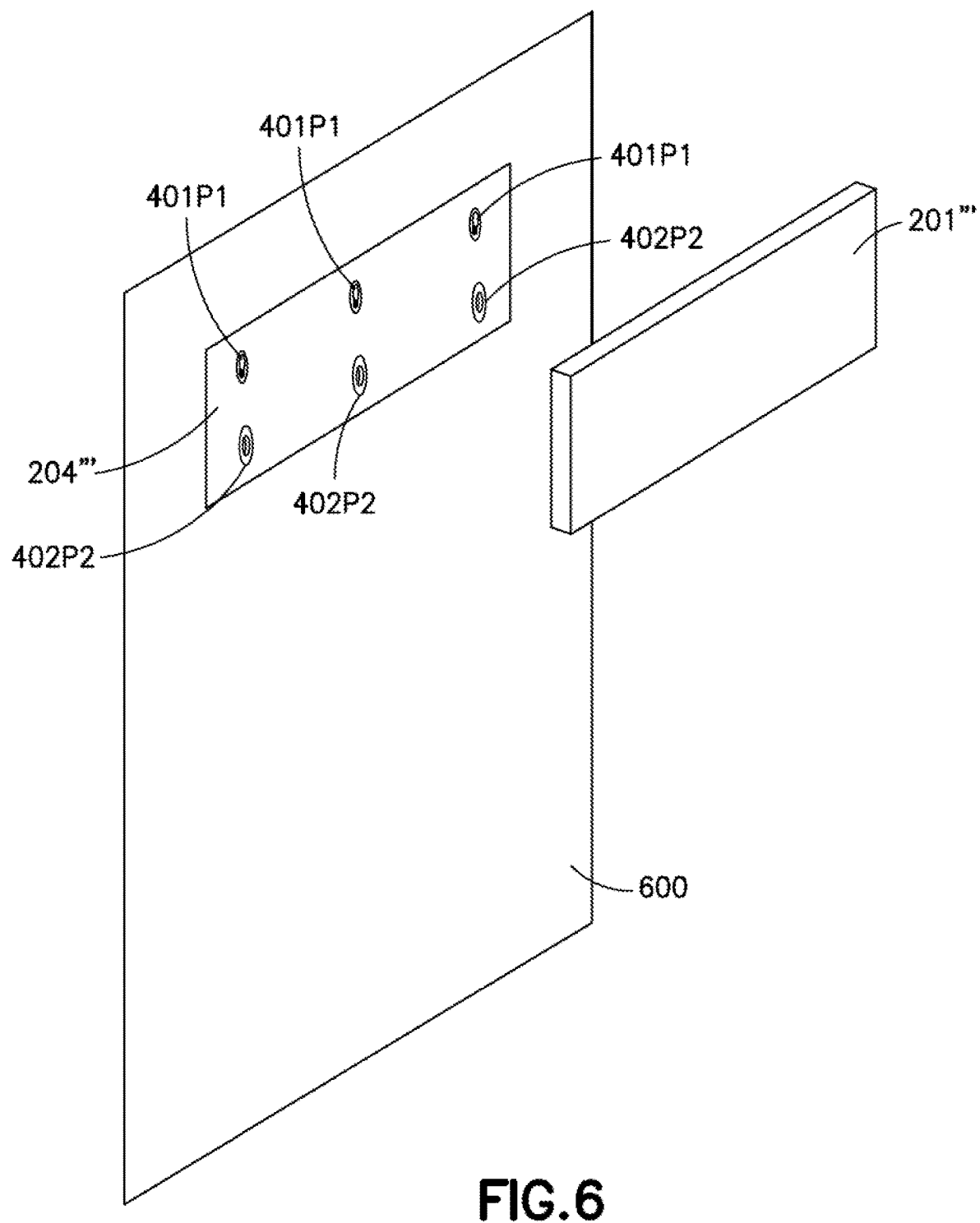
Figure 7A:
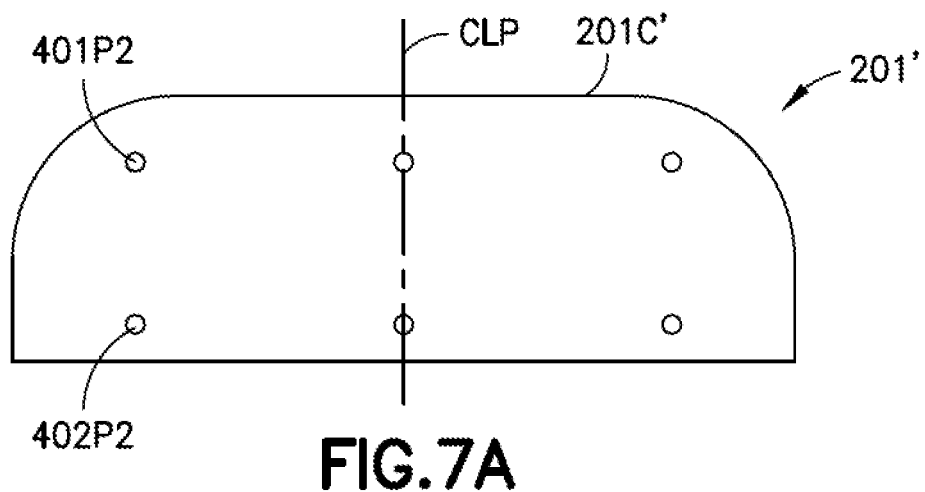
Figure 7B:
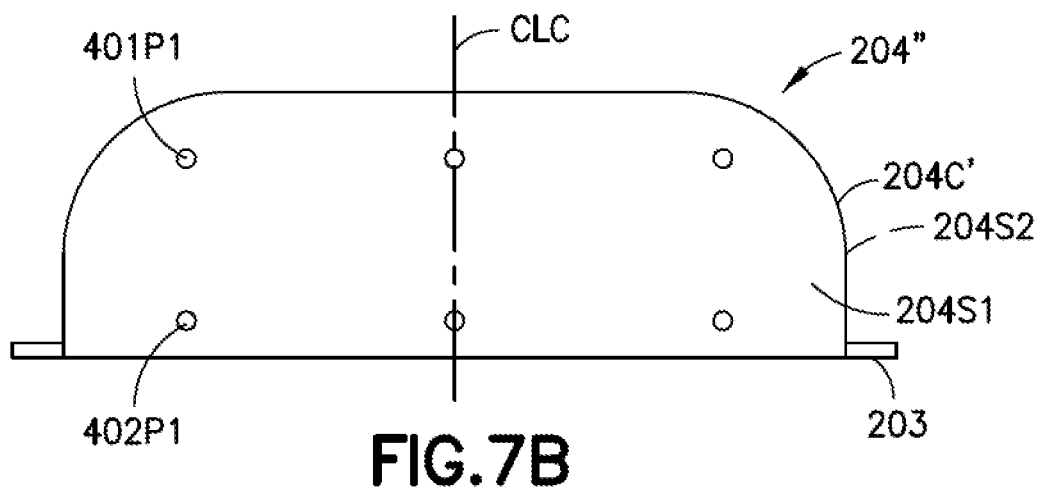
Figure 7C:
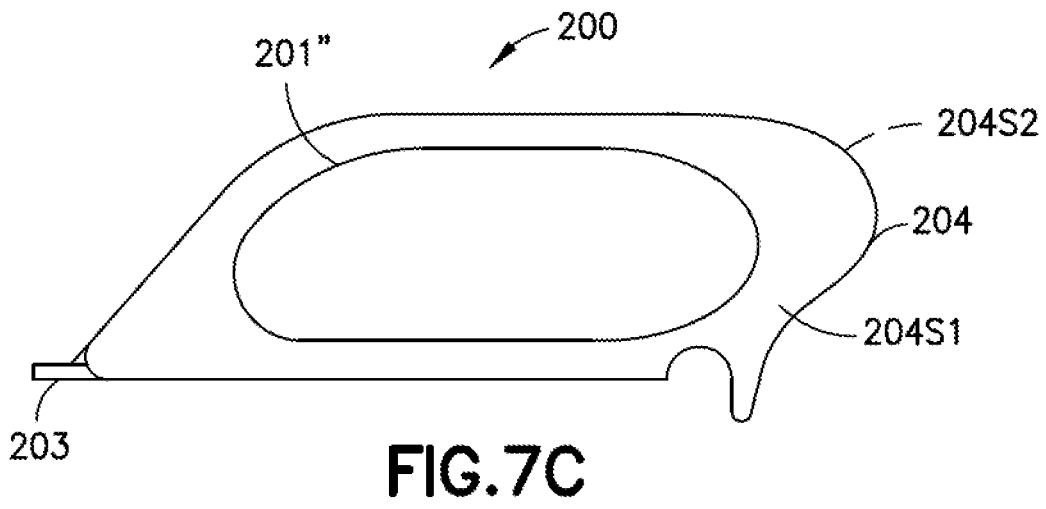
Figure 8:
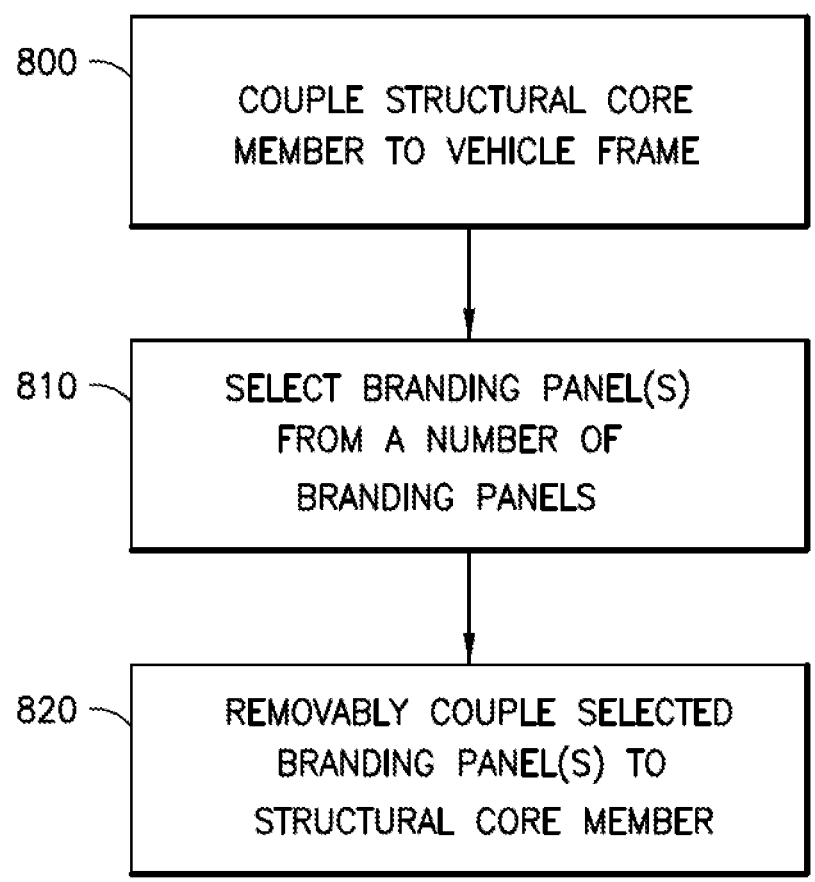

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a perspective illustration of a vehicle incorporating aspects of the present disclosure;

FIG. 2 is a perspective illustration of an interior of the vehicle incorporating aspects of the present disclosure;

FIG. 3A is an exploded perspective view of a header assembly in accordance with aspects of the present disclosure;

FIG. 3B is a perspective view of the header assembly of FIG. 3A in accordance with aspects of the present disclosure;

FIG. 3C is an exploded perspective view of a header assembly in accordance with aspects of the present disclosure;

FIG. 4A is a front view of a portion of the header assemblies of FIGS. 3A-3C in accordance with aspects of the present disclosure;

FIG. 4B is a side view of the portion of the header assembly illustrated in FIG. 4A in accordance with aspects of the present disclosure;

FIG. 4C is a perspective illustration of a quick-connect coupling of the header assemblies of FIGS. 3A-3C in accordance with aspects of the present disclosure;

FIG. 4D is a perspective illustration of a quick-connect coupling of the header assemblies of FIGS. 3A-3C in accordance with aspects of the present disclosure;

FIG. 5 is a perspective view of a structural core member of a header assembly in accordance with aspects of the present disclosure;

FIG. 6 is a perspective exploded view of a header assembly in accordance with aspects of the present disclosure:

FIGS. 7A and 7B are respectively front views of a branding panel and a structural core member of a header assembly in accordance with aspects of the present disclosure;

FIG. 7C is a front view of a header assembly in accordance with aspects of the present disclosure; and FIG. 8 is a flow diagram of a method in accordance with aspects of the present disclosure.

DETAILED DESCRIPTION

Referring to FIGS. 1 and 2, a header assembly 200 in accordance with aspects of the present disclosure is used at least in part to partition an interior portion of a vehicle 100, such as an aircraft or any other suitable aerospace, marine, or land based vehicle (e.g. trains, buses, boats, spacecraft, etc.). For exemplary purposes the vehicle 100 will be described herein as an aircraft that includes a frame 100F. The frame 100F forms a passenger cabin 100C and a cockpit 150. One or more aisles 100CA communicably connect the passenger cabin 100C and the cockpit 150 to each other and to one or more doors 100D of the vehicle 100. In one aspect, the passenger cabin 100C is divided into a first class section 151, a business class section 152 and a coach section 153. A cabin transition area 255 may separate each of the first class section 151, the business class section 152 and the coach section 153 from each other (e.g. a cabin transition area is located between each of the sections). Each cabin transition area 255 includes a passage 260 generally corresponding to a respective aisle 100CA so that passengers and crew members can migrate through the passenger cabin 100C to one or more of the first class section 151, the business class section 152 and the coach section 153. The cabin transition area 255 illustrated in FIG. 2 is shown as having a crew workstation 100CS but may include any other suitable vehicle feature (lavatories, galleys, etc.).

The header assembly 200 is disposed within the passage 260 adjacent a ceiling 250 of the passenger cabin 100C. A curtain or door (not shown) may be coupled to the header assembly 200 so that the curtain or door closes the passage 260. The curtain or door may serve to at least limit or otherwise restrict light from passing through the passage 260 below the header assembly 200. The header assembly is also configured to at least limit or otherwise restrict light from passing between adjacent sections of the vehicle 100, such as the first class section 151, the business class section 152 and the coach section 153. The header assembly 200 includes any suitable peripheral contour 200C that corresponds to a contour 250C of the ceiling 250. In one aspect, the header assembly 200 may also extend into a wash light cove formed at a juncture between the ceiling 250 and a side wall/overhead luggage compartment 251 of the vehicle 100.

The header assembly 200 in accordance with aspects of the present disclosure includes one or more branding panels 201, 202. Each branding panel 201, 202 is an interchangeable panel that can be easily and quickly manufactured. The branding panels 201, 202 are replaceable so that the owner or operator of the vehicle 100 can schedule regular change intervals to replace the branding panels 201, 202 so that the interior of the passenger cabin 100C remains current and reflect, for example, upcoming events (e.g. holidays, current movies, available discounts on travel, etc.). In one aspect, the branding panels 201, 202 can be interchangeably installed in the vehicle 100 to customize the passenger cabin 100C in any suitable manner, such as by one or more of adding decorative features (e.g. shapes, contours, etc.) to the passenger cabin, providing any suitable information to the passengers and/or crew, providing advertisements, providing luminescence, personalized messages, and any other suitable customization that may be desired.

The branding panels 201, 202 are configured so that each branding panel 201, 202 is installed and removed without tools. As such, the header assembly 200 with the interchangeable branding panels 201, 202 may provide the owner or operator of the vehicle 100 with the ability to easily change or upgrade branding options available within the passenger cabin 100C which in turn may provide additional revenue to the vehicle 100 owner or operator through, for example, advertising.

Referring to FIGS. 2, 3A and 3B, the header assembly 200 includes a structural core member 204, a header rail 203, at least one branding panel 201, 202 and a light blocking seal member 205. The header rail 203 is configured to span the passage 260 and couple to the frame 100F (FIG. 1) of the vehicle 100 in any suitable manner. For example, any suitable rails 100CR may be provided within the passenger cabin 100C where the rails 100CR extend along the aisle 100CA. The header rail 203 includes coupling members 203C that are configured to engage the rails 100CR and secure the header rail 203 within the passage 260. The structural core member 204 is, in one aspect, coupled to the header rail 203 in any suitable manner (e.g. adhesives, fasteners, etc.) so that the structural core member 204 extends from the header rail 203 towards the ceiling 250 of the passenger cabin 100C. In other aspects, the structural core member 204 and the header rail 203 are formed as a unitary one piece member. In one aspect, the header rail 203 may include any suitable tracks and/or hinges so that curtains or doors may be hung from the header rail 203 for closing the passage 260.

The structural core member 204 may be constructed of any suitable material including, but not limited to, plastics, foams, and composites. In one aspect, the structural core member 204 may comprise a single panel made of a honeycomb core with prepreg (resin and one of fiberglass or carbon fiber) material cured to sides of the structural core member to form a first side 204S1 and a second side 204S2 of the structural core member 204. The structural core member 204 may be manufactured in any suitable manner including, but not limited to, molding, additive manufacturing and/or machining. As described above, the structural core member 204 is shaped and sized so that a peripheral contour 204C of the structural core member 204 corresponds to the contour of the ceiling 250 and/or walls (e.g. side wall/overhead luggage compartment 251) of the passenger cabin 100C. The structural core member 204 includes a first side 204S1 and a second side 204S2. The second side 204S2 of the structural core member is spaced from the first side 204S1 so as to form opposite sides of the structural core member 204.

The at least one branding panel 201, 202 is removably coupled to the structural core member 204. For example, the at least one branding panel 201, 202 includes a first branding panel 201 removably coupled to the first side 204S1 of the structural core member 204 and a second branding panel 202 removably coupled to the second side 204S2 of the structural core member 204. At least one quick-connect coupling 401, 402 (see also FIGS. 4C and 4D) couples each branding panel 201, 202 to the structural core member 204. As used herein the term "quick-connect coupling" denotes a coupling having coupling features that are coupled and decoupled without tools (i.e. a tool-less coupling) through movement of the coupling features in a few as one or two linear and/or rotational movements. For example, referring also to FIGS. 4A-4D, each of the at least one quick-connect coupling 401, 402 has a first quick-connect portion 401P1, 402P1 coupled to the structural core member 402 and a second quick-connect portion 401P2, 402P2 coupled to each of the at least one branding panel 401, 402. The second quick-connect portion 401P2, 402P2 is configured to mate with a respective first quick-connect portion 401P1, 402P1 to removably couple the respective branding panel 401, 402 to the structural core member 204.

Still referring to FIGS. 3A and 4A-4C, the at least one quick-connect coupling 401, 402 includes at least one first quick-connect coupling 401 and at least one second quick-connect coupling 402. In one aspect, each of the first quick-connect couplings 401 comprises a key and keyhole coupling. Here the key forms the second quick-connect portion 401P2 disposed on the branding panel 201, 202 and the keyhole forms the first quick-connect portion 401P1 disposed on the structural core member 204. In other aspects the keyhole may be disposed on the branding panel 201, 202 and the key may be disposed on the structural core member 204. To couple the first quick-connect coupling 401 the second quick connect portion 401P2 (e.g. the key) is inserted into the first quick-connect portion 401P1 (e.g. the key hole) in a first linear movement and then moved linearly so that the key engages the slot in the keyhole in a second linear movement. In one aspect, each of the second quick-connect couplings 402 comprises a grommet and plug coupling. Here the grommet forms the first quick connect portion 402P1 disposed on the structural core member 204 and the plug forms the second quick connect portion 402P2 disposed on the branding panel 201, 202. In other aspects, the grommet may be disposed on branding panel 201, 202 and the plug may be disposed on the structural core member 204. To couple the second quick-connect coupling 402 the second quick connect portion 402P2 (e.g. the plug) is inserted into the first quick connect portion 402P1 (e.g. the grommet) in a single linear movement. In still other aspects, the at least one quick connect coupling 401, 402 may be any suitable quick-connect coupling including, but not limited to, quarter turn or half turn fasteners, clips and snaps.

Referring to FIGS. 3A and 3B, each of the at least one branding panel 201, 202 may be constructed with any suitable shape and size so that a respective peripheral contour 201C, 202C of the at least one branding panel 201, 202 corresponds to the contour 250C of the ceiling 250 of the passenger cabin 100C. As described above, in one aspect, the header assembly 200 may also extend into a wash light cove formed at a juncture between the ceiling 250 and a side wall/overhead luggage compartment 251 of the vehicle 100. For example, one or more of the structural core member 204 and the at least one branding panel 201, 202 extends into an outboard ceiling wash light cove WLC (FIG. 2) of the vehicle 100 (FIG. 1) and is configured to at least limit light transmission from a first portion WLCP1 of the outboard ceiling wash light cove WLC to a second portion WLCP2 of the outboard ceiling wash light cove WLC (noting that the first portion WLCP1 and the second portion WLCP2 are on opposite sides of the header assembly 200).

For example, the at least one branding panel 201, 202 may be manufactured in any suitable manner including, but not limited to, molding, machining, and/or additive manufacturing. In one aspect, referring to branding panel 201 for exemplary purposes, the at least one branding panel 201, 202 includes a frame 201F that may be manufactured by, e.g., molding, machining and/or additive manufacturing. Any suitable material 201M, such as canvas, plastic, etc., may be stretched over or otherwise coupled to the frame 201F in any suitable manner. The material 201M may be a screen printed (e.g. having a pattern, design, letters, numbers, words, picture, etc. printed thereon with ink(s)) material. A such, reference to the at least one branding panel 201, 202 being manufactured by any particular method(s), such as those described above, includes partially manufacturing the at least one branding panel 201, 202 by those methods where secondary operations are performed to complete the manufacture of the at least one branding panel 201, 202.

Referring to FIG. 3A, as described above, the at least one branding panel 201, 202 provides the owner or operator of the vehicle 100 (FIG. 1) the ability to maintain the passenger cabin 100C up to date so that the décor within the passenger cabin 100C reflects, for example, upcoming events (e.g. holidays, current movies, available discounts on travel, etc.) where the at least one branding panel 201, 202 provides one or more of decorative features (e.g. shapes, contours, etc.) to the passenger cabin, any suitable information to the passengers and/or crew, advertisements, luminescence, personalized messages, and any other suitable customization that may be desired. For example, in one aspect, the at least one branding panel 201 202 is selected from a number of different branding panels. For example the number of different branding panels includes a first set of branding panels 201SB and a second set of branding panels 202SB. Each of the different branding panels 201A-201n, 202A-202n in the respective first set of branding panels 201SB and second set of branding panels 202SB have a predetermined characteristic 201PDA-201PDn. 202PDA-202PDn that is different from other branding panels in the number of different branding panels (e.g. at least different from the branding panels in the respective first set of branding panels 201SB and second set of branding panels 202SB). For example, the predetermined characteristic 201PDA-201PDn. 202PDA-202PDn comprises one or more of a surface contour, a company logo, alphanumeric characters, translucency, a personalized message, wayfinding information, and decorative shapes. In one aspect, the first set of branding panels 201SB and the second set of branding panels 202SB may include one or more matched sets of branding panels where, for example, the predetermined characteristic 201PDA of branding panel 201 in the first set of branding panels 201SB corresponds with (or matches) the predetermined characteristic 202PDA of the branding panel 202A in the second set of branding panels 202SB.

Referring to FIG. 5, in one aspect, the structural core member 204 includes any suitable circuitry 500 that couples one or more light sources 510-515 to a vehicle power supply 520. For example, the circuitry 500 includes any suitable connector 500C that couples to the vehicle power supply 520 in any suitable manner (e.g. such as through a wired or wireless connection). The one or more light sources 510-515 may be any suitable light sources such as, for example, diffuse light sources. Referring also to FIG. 3A, in one aspect, at least one branding panel (such as branding panels 201A, 202A) has a translucent portion TP (or an open aperture) configured so that light from the one or more light sources 510-515 is exhibited through the translucent portion TP of at least one branding panel 201A, 202A. Here the translucent portion TP is illustrated as having a star shape but in other aspects the translucent portion may have any suitable shape. In still other aspects the branding panel may be constructed of a translucent material so that the branding panel appears to glow.

While the aspects of the present disclosure have been described with a structural core member 204 that is formed as a single member, in other aspects the structural core member 204' may be constructed in any suitable number of pieces. For example, referring to FIG. 3A, the structural core member 204' comprises a first portion 204A and at least a second portion 204B. The first portion 204A and at least the second portion 204B are substantially similar to the single member structural core member 204 illustrated in FIGS. 3A, 3B, and 5. Each of the first portion 204A and the second portion 204B are coupled to the header rail 203 in the manner described above with respect to the structural core member 204. In this aspect, the at least one branding panel 201, 202 is configured to be removably coupled to the first portion 204A and the second portion 204B with quick-connect couplings 401, 402 in the manner described herein.

In one aspect, as illustrated in e.g. FIG. 3A, the at least one branding panel 201, 202 may be unidirectional panels. For example, the peripheral contour 201A, 202C of a respective branding panel 201, 202 (and a peripheral contour 200C of the header assembly 200) may be such that each branding panel can be coupled only to one side of the structural core member 204. For example, branding panel 201 may have a peripheral contour 201C and the contour 250C of the ceiling 250 (FIG. 2) may be such that the branding panel 201 can only be coupled to the first side 204S1 of the structural core member 204. Similarly, branding panel 202 may have a peripheral contour 202C and the contour 250C of the ceiling 250 (FIG. 2) may be such that the branding panel 202 can only be coupled to the second side 204S2 of the structural core member 204. Referring to FIGS. 7A and 7B, in one aspect, the header assembly 200 includes a structural core member 204" that has a peripheral contour 204C' that is substantially symmetrical about a centerline CLC of the structural core member 204". The symmetry of the structural core member 204" provides for the manufacture of branding panels that are configured so that one branding panel 201' of the at least one branding panel 201, 202 is coupleable to either one of the first side 204S1 and the second side 204S2 of the structural core member 204". For example, the branding panel 201' (which is substantially similar to the branding panels described herein) includes a peripheral contour 201C' that is symmetrical about a centerline CLP of the branding panel 201'. In this aspect the symmetry of the structural core member 204" and the branding panel 201' provides for the coupling of the branding panel 201' on either one of the first side 204S1 and the second side 204S2 of the structural core member 204". In other aspects, referring to FIG. 7C, the structural core member 204 may be asymmetrical (as illustrated in FIGS. 3A and 7C); however, the branding panel 201" (which is substantially similar to the branding panels described herein) is shaped and sized (e.g. is shaped and sized small enough) so that the branding panel 201" can be coupled to either one of the first side 204S 1 and the second side 204S2 of the structural core member 204.

Referring to FIGS. 2, 3A, and 3B, as described above, the header assembly 200 includes a light blocking seal member 205 that is configured to at least limit the passage of between the peripheral edge of the header assembly 200 and the ceiling 250 (and/or side wall/overhead luggage compartment 251). For example, the light blocking seal member 205 is disposed at least partially around a perimeter edge PE (FIG. 3A) of the structural core member 204. The perimeter edge PE defines the peripheral contour 204C of the structural core member 204. The light blocking seal member 205 is constructed of any suitable resilient light blocking material so as to substantially seal any gaps or openings (through which light may pass) that exist between, for example, the structural core member 204 and the ceiling 250 (and/or side wall/overhead luggage compartment 251) when the header assembly 200 is installed within the passenger cabin 100C.

Referring to FIG. 6, the aspects of the present disclosure may also be applied in instances where only one side of the structural core member 204 is exposed. For example, the vehicle may include any suitable monument 600, such as a wall. In one aspect, the monument 600 may be a wall adjacent a door of the cockpit 150 (FIG. 1) and/or the side wall/overhead luggage compartment 251 (FIG. 2). Here the structural core member 204''' is affixed substantially directly to the monument 600 in any suitable manner (either removably or permanently). The structural core member 204''' is substantially similar to the structural core members described herein. A branding panel, such as branding panel 201''' (which is substantially similar to the branding panels described herein) is removably coupled to the structural core member 204''' to form a placard affixed to the monument 600. It should also be understood that the structural core member 204''' could also be coupled to a door header as well, such as where the monument 600 frames (e.g. extends along the sides and top of) the door.

Referring to FIG. 3A (for exemplary purposes) an exemplary method will be described in accordance with aspects of the present disclosure. The structural core member 204 is coupled to the frame 100F of the vehicle 100 (FIG. 1) in the manner described herein (FIG. 8, Block 800). At least one branding panel 201, 202 is selected from a number of branding panels 201A-201n, 202A-202n (FIG. 8, Block 810). In one aspect, the at least one branding panel 201, 202 comprises a first branding panel 201 and a second branding panel 202 where the first branding panel 201 is selected from a first set of branding panels 201SB and the second branding panel 202 is selected from a second set of branding panels 202SB.

The at least one branding panel 201, 202 is removably coupled to the structural core member 204 (FIG. 8, Block 820) with at least one quick-connect coupling 401, 402 (FIGS. 4C and 4D) having a first quick-connect portion 401P1, 402P1 coupled to the structural core member 204 and a second quick-connect portion 401P2, 402P2 coupled to the at least one branding panel 201, 202, where, as described herein, the second quick-connect portion 401P2, 402P2 is configured to mate with a respective first quick-connect portion 401P1, 402P1 to removably couple the at least one branding panel 201, 202 to the structural core member 204. In one aspect the first branding panel 201 is removably coupled to a first side 204S1 of the structural core member 204 and the second branding panel 202 is removably coupled to a second side 204S2 of the structural core member 204.

As described above, each branding panel 201A-201n, 202A-202n in the number of different branding panels 201A-201n, 202A-202n has a predetermined characteristic 201PDA-201PDn, 202PDA-202PDn that is different from a predetermined characteristic 201PDA-201PDn, 202PDA-202PDn of other branding panels 201A-201n, 202A-202n in the number of different branding panels 201A-201n. 202A-202n. In one aspect, the structural core member 204' comprises a first portion 204A and at least a second portion 204B and the method includes removably coupling the at least one branding panel 201, 202 to both the first portion 204A and the second portion 204B of the structural core member 204'. In one aspect, the at least one branding panel 201, 202 is coupled to the structural core member with a tool-less quick-connect coupling.

The following are provided in accordance with aspects of the present disclosure:

A1. A header assembly comprising:
a structural core member;
at least one branding panel removably coupled to the structural core member; and
at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member.

A2. The header assembly of paragraph A1, wherein:
the structural core member comprises a first side and a second side, the second side being spaced from the first side so as to form opposite sides of the structural core member; and
the at least one branding panel includes a first branding panel removably coupled to the first side and a second branding panel removably coupled to the second side.

A3. The header assembly of paragraph A1, wherein:
the structural core member comprises a diffuse light source; and
the at least one branding panel has a translucent portion configured so that light from the diffuse light source is exhibited through the translucent portion of the at least one branding panel.

A4. The header assembly of paragraph A1, wherein the at least one branding panel is selected from a number of different branding panels, each of the different branding panels having a predetermined characteristic that is different from other branding panels in the number of different branding panels.

A5. The header assembly of paragraph A4, wherein the predetermined characteristic comprises one or more of a surface contour, a company logo, alphanumeric characters, translucency, a personalized message, wayfinding information, and decorative shapes.

A6. The header assembly of paragraph A1, wherein the at least one branding panel comprises a molded structure.

A7. The header assembly of paragraph A1, wherein the at least one branding panel comprises an additively manufactured structure.

A8. The header assembly of paragraph A1, wherein the structural core member comprises a first portion and at least a second portion and the at least one branding panel is configured to be removably coupled to the first portion and the second portion.

A9. The header assembly of paragraph A1, wherein the structural core member includes a first side and a second side, the first side, the second side and one of the at least one branding panel are configured so that the one of the at least one branding panel is coupleable to either one of the first side and the second side.

A10. The header assembly of paragraph A1, wherein the at least one quick-connect coupling comprises a grommet and plug coupling.

A11. The header assembly of paragraph A1, wherein the at least one quick-connect coupling comprises a key and keyhole coupling.

A12. The header assembly of paragraph A1, wherein the at least one quick-connect coupling comprises a tool-less quick-connect coupling.

A13. The header assembly of paragraph A1, further comprising a light blocking seal member disposed at least partially around a perimeter edge of the structural core member.

A14. The header assembly of paragraph A1, wherein one or more of the structural core member and the at least one branding panel extends into an outboard ceiling wash light cove of an aircraft and is configured to at least limit light transmission from a first portion of the outboard ceiling wash light cove to a second portion of the outboard ceiling wash light cove.

B1. A header assembly comprising:
a structural core member configured for coupling with a curtain header rail of an aircraft, the structural core member having an first side and a second side, the second side being spaced from the first side so as to form opposite sides of the structural core member;
a first branding panel removably coupled to the first side of the structural core member;
a second branding panel removably coupled to the second side of the structural core member; and
at least one quick-connect coupling disposed on each of the first side and the second side of the structural core member, each quick-connect coupling having
a first quick-connect portion coupled to a respective one of the first side and the second side of the structural core member, and
a second quick-connect portion coupled to a respective one of the first branding panel and the second branding panel, the second quick-connect portion being configured to mate with a respective first quick-connect portion to removably couple a respective one of the first branding panel and the second branding panel to the respective one of the first side and the second side of the structural core member.

B2. The header assembly of paragraph B1, wherein:
the structural core member comprises a diffuse light source; and
at least one of the first branding panel and the second branding panel has a translucent portion configured so that light from the diffuse light source is exhibited through the translucent portion of the at least one of the first branding panel and the second branding panel.

B3. The header assembly of paragraph B1, wherein the first branding panel is selected from a first set of branding panels, each branding panel in the first set of branding panels having a first predetermined characteristic that is different from other branding panels in the first set of branding panels.

B4. The header assembly of paragraph B1, wherein the first predetermined characteristic comprises one or more of a surface contour, a company logo, alphanumeric characters, translucency, a personalized message, wayfinding information, and decorative shapes.

B5. The header assembly of paragraph B1, wherein the second branding panel being selected from a second set of branding panels, each branding panel in the second set of branding panels having a second predetermined characteristic that is different from other branding panels in the second set of branding panels.

B6. The header assembly of paragraph B1, wherein the second predetermined characteristic comprises one or more of a surface contour, a company logo, alphanumeric characters, translucency, a personalized message, wayfinding information, and decorative shapes.

B7. The header assembly of paragraph B1, wherein at least one of the first branding panel and the second branding panel comprises a molded structure.

B8. The header assembly of paragraph B1, wherein at least one of the first branding panel and the second branding panel comprises an additively manufactured structure.

B9. The header assembly of paragraph B1, wherein the structural core member comprises a first portion and at least a second portion and each of the first branding panel and the second branding panel is configured to be removably coupled to the first portion and the second portion.

B10. The header assembly of paragraph B1, wherein the first branding panel is removably coupleable to one of both the first side and the second side of the structural core member, and the second branding panel is removably coupleable to another one of both the first side and the second side of the structural core member.

B11. The header assembly of paragraph B1, wherein the at least one quick-connect coupling comprises a grommet and plug coupling.

B12. The header assembly of paragraph B1, wherein the at least one quick-connect coupling comprises a key and keyhole coupling.

B13. The header assembly of paragraph B1, wherein the at least one quick-connect coupling comprises a tool-less quick-connect coupling.

B14. The header assembly of paragraph B1, further comprising a light blocking seal member disposed at least partially around a perimeter edge of the structural core member.

B15. The header assembly of paragraph B1, wherein one or more of the structural core member, the first branding panel and the second branding panel extends into an outboard ceiling wash light cove of an aircraft and is configured to at least limit light transmission from a first portion of the outboard ceiling wash light cove to a second portion of the outboard ceiling wash light cove.

C1. An aircraft comprising the header assembly of any one of paragraphs A1-A14 and/or any one of paragraphs B1-B15.

D1. A method using a header assembly, the method comprising:

selecting at least one branding panel from a number of branding panels; and removably coupling the at least one branding panel to a structural core member with at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member;

wherein the structural core member is coupled to a vehicle frame.

D2. The method of paragraph D1, wherein each branding panel in the number of different branding panels has a predetermined characteristic that is different from other branding panels in the number of different branding panels.

D3. The method of paragraph D2, wherein the different predetermined characteristic comprises one or more of a surface contour, a company logo, alphanumeric characters, translucency, a personalized message, wayfinding information and decorative shapes.

D4. The method of paragraph D1, wherein the structural core member comprises a first portion and at least a second portion and removably coupling the at least one branding panel to the structural core member comprises removably coupling the at least one branding panel to the first portion and the second portion.

D5. The method of paragraph D1, wherein the at least one quick-connect coupling comprises a tool-less quick-connect coupling.

D6. The method of paragraph D1, wherein:

the at least one branding panel comprises a first branding panel and a second branding panel where the first branding panel is selected from a first set of branding panels, each branding panel in the first set of branding panels having a first different predetermined characteristic that is different from other branding panels in the first set of branding panels, and the second branding panel being selected from a second set of branding panels, each branding panel in the second set of branding panels having a second different predetermined characteristic that is different from other branding panels in the second set of branding panels; and removably coupling the at least one branding panel to the structural core member comprises removably coupling the first branding panel to a first side of the structural core member and removably coupling the second branding panel to a second side of the structural core member.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A header assembly comprising:
a structural core member configured for coupling with a header rail of an aircraft;
at least one branding panel removably coupled to the structural core member; and
at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member.

2. The header assembly of claim 1, wherein:
the structural core member comprises a diffuse light source; and
the at least one branding panel has a translucent portion configured so that light from the diffuse light source is exhibited through the translucent portion of the at least one branding panel.

3. The header assembly of claim 1, wherein the at least one branding panel is selected from a number of different branding panels, each of the different branding panels having a predetermined characteristic that is different from other branding panels in the number of different branding panels.

4. The header assembly of claim 3, wherein the predetermined characteristic comprises one or more of a surface contour, a company logo, alphanumeric characters, translucency, a personalized message, wayfinding information, and decorative shapes.

5. The header assembly of claim 1, wherein the at least one branding panel comprises a molded structure.

6. The header assembly of claim 1, wherein the at least one branding panel comprises an additively manufactured structure.

7. The header assembly of claim 1, wherein the structural core member comprises a first portion and at least a second portion and the at least one branding panel is configured to be removably coupled to the first portion and the second portion.

8. The header assembly of claim 1, wherein the structural core member includes a first side and a second side, the first side, the second side and one of the at least one branding panel are configured so that the one of the at least one branding panel is coupleable to either one of the first side and the second side.

9. The header assembly of claim 1, further comprising a light blocking seal member disposed at least partially around a perimeter edge of the structural core member.

10. A header assembly comprising:
a structural core member configured for coupling with a header rail of an aircraft, the structural core member having an first side and a second side, the second side being spaced from the first side so as to form opposite sides of the structural core member;
a first branding panel removably coupled to the first side of the structural core member;
a second branding panel removably coupled to the second side of the structural core member; and
at least one quick-connect coupling disposed on each of the first side and the second side of the structural core member, each quick-connect coupling having
a first quick-connect portion coupled to a respective one of the first side and the second side of the structural core member, and
a second quick-connect portion coupled to a respective one of the first branding panel and the second branding panel, the second quick-connect portion being configured to mate with a respective first quick-connect portion to removably couple a respective one of the first branding panel and the second branding panel to the respective one of the first side and the second side of the structural core member.

11. The header assembly of claim 10, wherein the first branding panel is selected from a first set of branding panels, each branding panel in the first set of branding panels having a first predetermined characteristic that is different from other branding panels in the first set of branding panels.

12. The header assembly of claim 10, wherein the second branding panel being selected from a second set of branding panels, each branding panel in the second set of branding panels having a second predetermined characteristic that is different from other branding panels in the second set of branding panels.

13. The header assembly of claim 10, wherein the first branding panel is removably coupleable to one of both the first side and the second side of the structural core member, and the second branding panel is removably coupleable to another one of both the first side and the second side of the structural core member.

14. The header assembly of claim 10, wherein the at least one quick-connect coupling comprises a tool-less quick-connect coupling.

15. The header assembly of claim 10, further comprising a light blocking seal member disposed at least partially around a perimeter edge of the structural core member.

16. A method using a header assembly, the method comprising:
selecting at least one branding panel from a number of branding panels; and
removably coupling the at least one branding panel to a structural core member with at least one quick-connect coupling having a first quick-connect portion coupled to the structural core member and a second quick-connect portion coupled to the at least one branding panel, the second quick-connect portion being configured to mate with the first quick-connect portion to removably couple the at least one branding panel to the structural core member;
wherein the structural core member forms a portion of the header assembly of an aircraft that is coupled to a frame of the aircraft.

17. The method of claim 16, wherein each branding panel in the number of different branding panels has a predetermined characteristic that is different from other branding panels in the number of different branding panels.

18. The method of claim 17, wherein the different predetermined characteristic comprises one or more of a surface contour, a company logo, alphanumeric characters, translucency, a personalized message, wayfinding information and decorative shapes.

19. The method of claim 16, wherein the structural core member comprises a first portion and at least a second portion and removably coupling the at least one branding panel to the structural core member comprises removably coupling the at least one branding panel to the first portion and the second portion.

20. The method of claim 16, wherein:
the at least one branding panel comprises a first branding panel and a second branding panel where
the first branding panel is selected from a first set of branding panels, each branding panel in the first set of branding panels having a first different predetermined characteristic that is different from other branding panels in the first set of branding panels, and
the second branding panel being selected from a second set of branding panels, each branding panel in the second set of branding panels having a second different predetermined characteristic that is different from other branding panels in the second set of branding panels; and
removably coupling the at least one branding panel to the structural core member comprises removably coupling the first branding panel to a first side of the structural core member and removably coupling the second branding panel to a second side of the structural core member.

* * * * *